United States Patent
Park et al.

(10) Patent No.: US 8,755,057 B2
(45) Date of Patent: Jun. 17, 2014

(54) HOST APPARATUS AND METHOD TO SHARE FAVORITE IMAGE READING APPARATUSES THEREOF

(75) Inventors: Hyun-jung Park, Seoul (KR); Hak-ju Lee, Suwon-si (KR); Jung-mo Hong, Suwon-si (KR); Dong-hoan Koo, Suwon-si (KR); Kyung-hoon Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 956 days.

(21) Appl. No.: 12/801,338

(22) Filed: Jun. 3, 2010

(65) Prior Publication Data

US 2011/0043841 A1    Feb. 24, 2011

(51) Int. Cl.
  *G06F 15/00* (2006.01)

(52) U.S. Cl.
  USPC ........ 358/1.13; 358/1.15; 358/1.16; 709/203; 709/223; 715/738; 715/783

(58) Field of Classification Search
  USPC ............... 358/1.13, 1.15, 1.16; 709/203, 223; 715/738, 783
  See application file for complete search history.

(56) References Cited

U.S. PATENT DOCUMENTS

| | | | |
|---|---|---|---|
| 2004/0064532 A1* | 4/2004 | Schacht et al. | 709/221 |
| 2004/0201613 A1* | 10/2004 | Simpson et al. | 345/738 |
| 2007/0206219 A1* | 9/2007 | Yanagi | 358/1.15 |
| 2008/0052384 A1* | 2/2008 | Marl et al. | 709/223 |
| 2008/0184162 A1* | 7/2008 | Lindsey et al. | 715/783 |

\* cited by examiner

*Primary Examiner* — Steven Kau
*Assistant Examiner* — Mark Milia
(74) *Attorney, Agent, or Firm* — Staas & Halsey LLP

(57) ABSTRACT

A host apparatus and a method to share favorite image reading apparatuses thereof are provided. The method to share favorite image reading apparatuses of a host apparatus includes registering at least one of searched image reading apparatuses to a list of favorite image reading apparatuses; selecting at least one of the registered favorite image reading apparatuses to be shared; activating a sharing function to share the selected favorite image reading apparatus; transmitting the list of favorite image reading apparatuses to or receiving a list of favorite image reading apparatuses from another host apparatus of which the sharing function is activated. Therefore, a universal driver may share a list of favorite image reading apparatuses.

23 Claims, 10 Drawing Sheets

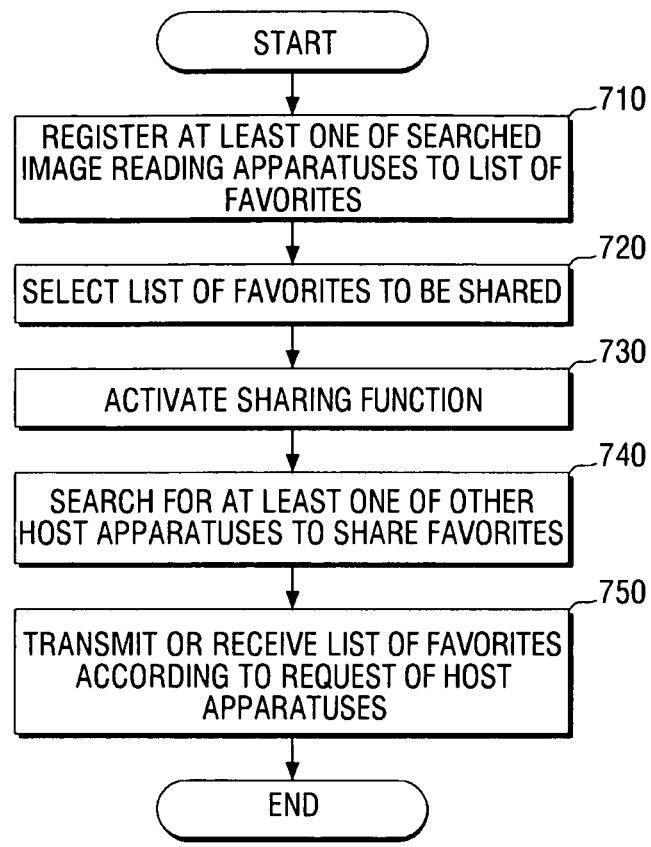

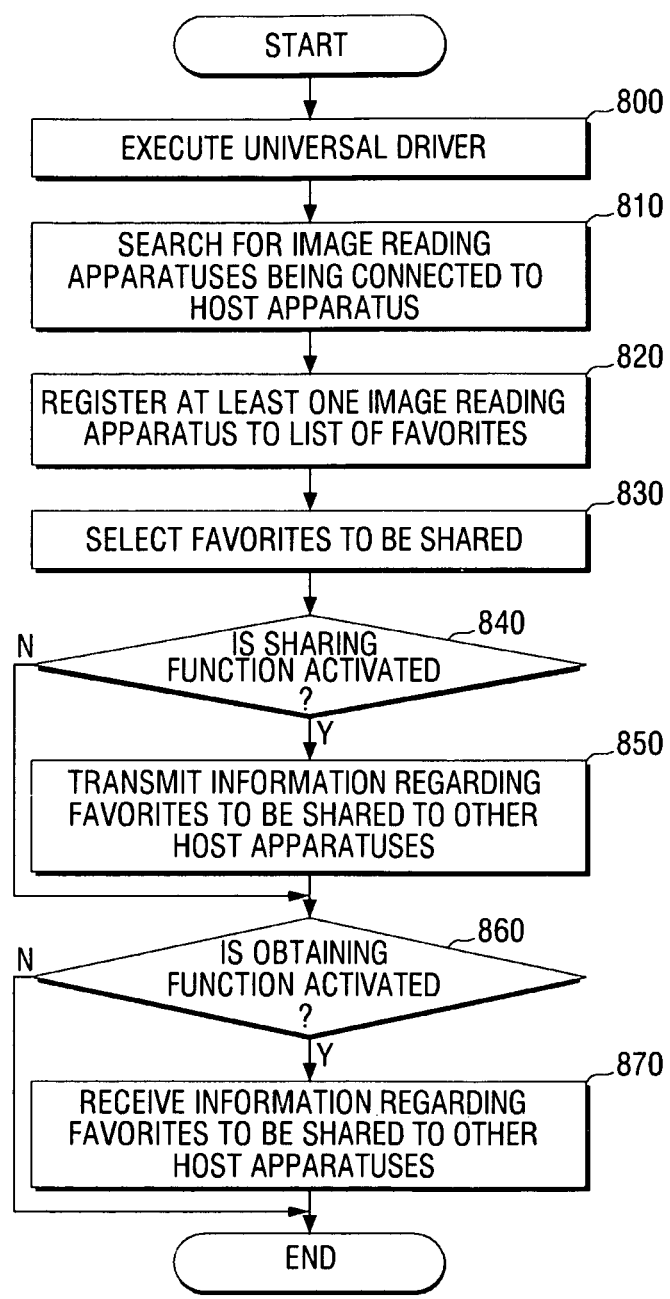

HOST APPARATUS AND METHOD TO SHARE FAVORITE IMAGE READING APPARATUSES THEREOF

CROSS-REFERENCE TO RELATED APPLICATIONS

This application claims the benefit of Korean Patent Application No. 2009-77513, filed in the Korean Intellectual Property Office on Aug. 21, 2009, the disclosure of which is incorporated herein by reference.

BACKGROUND

1. Field

Aspects of the present embodiments relate to a host apparatus and a method to share favorites thereof, and more particularly, to a host apparatus to share favorites which are stored on a universal driver of image reading apparatuses with other host apparatuses connected to a network.

2. Description of the Related Art

Generally, a single scanner is connected to a single computer. However, with the development of networks, a plurality of scanners is connected to a plurality of computers via various types of networks. Accordingly, a user can select and use a desired scanner among the plurality of scanners being connected to the plurality of computers via a network.

However, the user should install driver programs for each scanner onto a computer so the user can use the scanner since each manufacturer and each model provide different driver programs.

Accordingly, even if a plurality of scanners is connected via a network, a user needs to install the driver program of a desired scanner onto a computer to use the scanner.

In addition, if a scanner is disconnected from a computer while a user uses the scanner, or another problem occurs at the scanner, a user needs to search for another scanner, and select and connect the other scanner. These operations are very troublesome and require considerable time and effort.

SUMMARY

Aspects of the present embodiments relate to a host apparatus in which a plurality of host apparatuses being connected to a computer via network exchange favorites with each other and thus the operation of searching and selecting an image reading apparatus for each host apparatus is omitted and a method to share favorites thereof.

Additional aspects and/or advantages of the invention will be set forth in part in the description which follows and, in part, will be obvious from the description, or may be learned by practice of the invention.

The foregoing and/or other aspects are achieved by providing a method to share favorite image reading apparatuses of a first host apparatus which is connected to at least another host apparatus over a network, and to which a universal driver capable of controlling a plurality of image reading apparatuses is installed, the method including: searching for image reading apparatuses and registering at least one of the searched image reading apparatuses to a list of favorite image reading apparatuses at the first host apparatus, by the universal driver; selecting at least one of the registered favorite image reading apparatuses to be shared; activating a sharing function to share the selected favorite at least one image reading apparatus; searching for another host apparatus to share the favorite at least one image reading apparatus; and transmitting the list of favorite image reading apparatuses or receiving a list of favorite image reading apparatuses according to a request of one of the first host apparatus and the other host apparatus when the first host apparatus is connected to the searched other host apparatus.

The method may further include updating the list of favorite image reading apparatuses at the first host apparatus or the searched other host apparatus according to the result of transmitting or receiving the list of favorite reading apparatuses.

The method may further include: activating an obtaining function; and receiving information regarding the favorite image reading apparatuses to be shared, which is set at the other host apparatus, from the other host apparatus.

The registering may include registering one of the searched image reading apparatuses, and the selecting may include selecting the image reading apparatus to be shared.

The registering may further include: creating at least one group of favorite image reading apparatuses; and registering at least one of the searched image reading apparatuses to the created group of favorite image reading apparatuses, wherein the selecting may include selecting at least one group of favorite image reading apparatuses to which the at least one image reading apparatus is registered to be shared.

The method may further include: displaying information regarding favorite image reading apparatuses to be shared, which is received from the other host apparatus, on a list of favorite image reading apparatuses obtained from an external source; and moving at least one of the shared information displayed on the list of favorite image reading apparatuses obtained from an external source to the list of favorite image reading apparatuses at the first host apparatus.

The method may further include setting a password to assert authorization for the selected at least one favorite image reading apparatus to be shared.

The method may further include: uploading information regarding the selected at least one favorite image reading apparatus to be shared to a shared server; uploading information regarding at least one favorite image reading apparatus to be shared from the other host apparatus to the shared server; and downloading the information regarding the shared at least one favorite image reading apparatus of the other host apparatus from the shared server.

The list of favorite image reading apparatuses of the first host apparatus or the other host apparatus may include a shared part and an obtained part, the selecting including selecting at least one of the lists in the shared part, by a user.

The foregoing and/or other aspects are achieved by providing a host apparatus connected to at least one other host apparatus over a network, the host apparatus including: a universal driver capable of controlling at least one image reading apparatus, the universal driver searching for image reading apparatuses, registering at least one of the searched image reading apparatuses to a list of favorite image reading apparatuses, and selecting at least one of the registered favorite image reading apparatuses to be shared; an input unit to receive a request signal to activate a sharing function to share the selected at least one favorite image reading apparatus; and a network interface to search for at least one other host apparatus to share the selected at least one favorite image reading apparatus, and to transmit the list of favorite image reading apparatuses of the host apparatus or receive a list of favorite image reading apparatuses of the other host apparatus according to a request of one of the host apparatus and the other host apparatus when the host apparatus is connected to the searched other host apparatus.

The network interface may update the list of favorite image reading apparatuses on the host apparatus or the list of favorite image reading apparatuses on the other host apparatus according to a result of transmitting the list of favorite image reading apparatuses of the host apparatus and receiving the list of favorite image reading apparatuses of the other host apparatus.

The input unit may receive a request signal to activate an obtaining function, and the network interface may receive information regarding the favorite image reading apparatuses to be shared, which is set at the other host apparatus, from the other host apparatus.

The universal driver may register one of the searched image reading apparatuses, and sets the image reading apparatus to be shared.

The universal driver may create at least one group of favorite image reading apparatuses on the list of favorite image reading apparatuses, registers at least one of the searched image reading apparatuses to the created group of favorite image reading apparatuses, and sets at least one of the groups of favorite image reading apparatuses to which the at least one image reading apparatus is registered to be shared.

The host apparatus may further include: a display to display the list of favorite image reading apparatuses and the list of obtained favorite image reading apparatuses, wherein the universal driver may control the display to display information regarding favorite image reading apparatuses to be shared, which is received from the other host apparatus, on the list of obtained favorite image reading apparatuses, and move at least one of the shared information displayed on the list of obtained favorite image reading apparatuses to the list of favorite image reading apparatuses at the host computer.

The universal driver may receive a password corresponding to the selected at least one favorite image reading apparatus to be shared through the input unit, and sets, the password to the selected at least one favorite image reading apparatus to be shared.

The network interface may upload information regarding the selected at least one favorite image reading apparatus to be shared to a shared server, and may download the information regarding the shared at least one favorite image reading apparatus of the other host apparatus from the shared server.

The foregoing and/or other aspects are achieved by providing a shared system for sharing favorite image reading apparatuses, the shared system including: at least one image reading apparatus; at least one host apparatus connected to the at least one image reading apparatus over a network, the at least one host apparatus to transmit information regarding at least one favorite image reading apparatus to be shared when at least one of the image reading apparatuses registered to a list of favorite image reading apparatuses is set to be shared; and a shared server to receive and store the transmitted information.

The shared server may transmit the stored information regarding at least one favorite image reading apparatus to be shared to a specific host apparatus according to a request of the specific host apparatus among the at least one host apparatus.

The at least one host apparatus may update information regarding the at least one favorite image reading apparatus to be shared based on a result of transmitting information regarding the at least one favorite image reading apparatus to be shared or receiving information regarding at least one favorite image reading apparatus to be shared.

BRIEF DESCRIPTION OF THE DRAWINGS

These and/or other aspects will become apparent and more readily appreciated from the following description of the embodiments, taken in conjunction with the accompanying drawings, of which:

FIG. 7 is a flowchart of the process of sharing favorites of a host apparatus according to an exemplary embodiment; and FIG. 8 is a flowchart of the process of sharing favorites of a host apparatus according to another exemplary embodiment.

DETAILED DESCRIPTION

Figure 1:
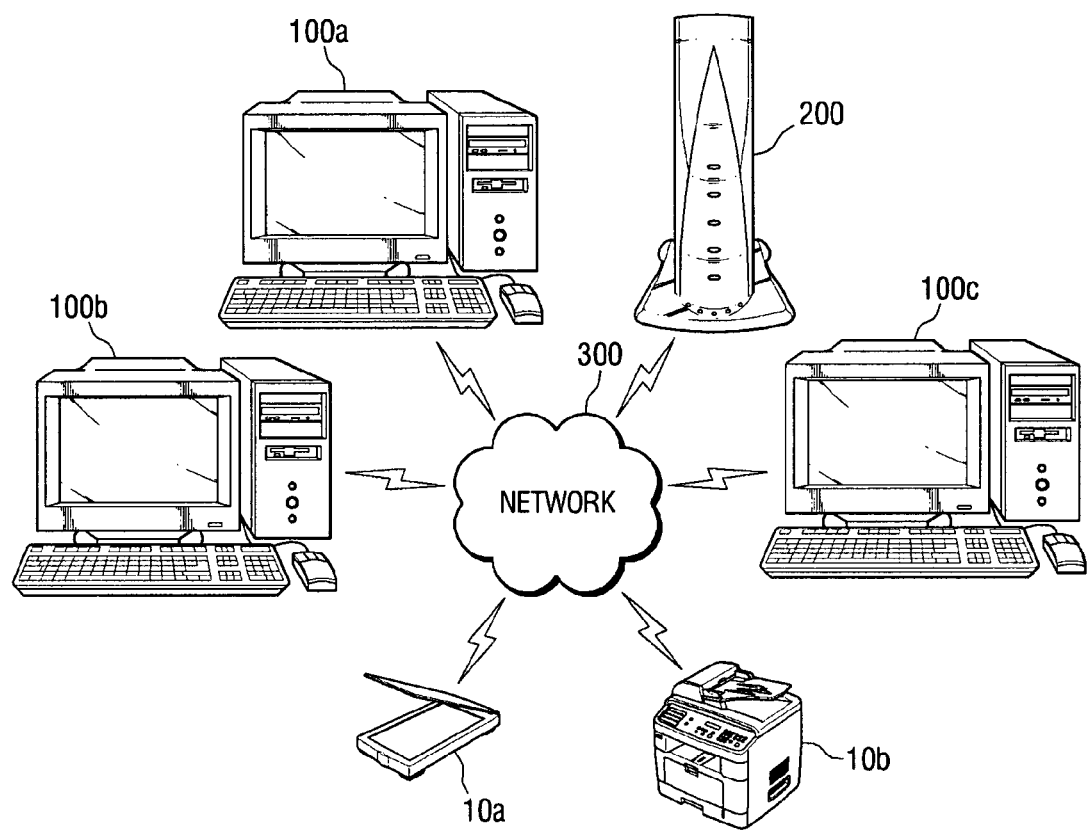
FIG. 1 is a structural diagram of network of a system to share favorites according to an exemplary embodiment.

Reference will now be made in detail to the exemplary embodiments, examples of which are illustrated in the accompanying drawings, wherein like reference numerals refer to like elements throughout. The embodiments are described below, in order to explain the present invention by referring to the figures.

FIG. 1 is a structural diagram of network of a system of sharing favorites according to an exemplary embodiment.

Referring to FIG. 1, a system of sharing favorites according to an exemplary embodiment includes image reading apparatuses 10a and 10b, a plurality of host apparatuses 100a to 100c, and a shared server 200. The image reading apparatuses 10a and 10b, the plurality of host. apparatuses 100a to 100c, and the shared server 200 may be connected to each other via a network 300. The image reading apparatuses 10a and 10b, the plurality of host apparatuses 100a to 100c, and the shared server 200 are connected via wireless network 300 in this exemplary embodiment, but this is merely an exemplary embodiment. Accordingly, they may also be connected over a wireline.

Each of the plurality of host apparatuses 100a to 100c may be connected to each other, via the network 300, and may also be connected to the shared server 200 via the network 300. A universal driver to control the plurality of image reading apparatuses 10a and 10b using a single driver program is installed in each of the plurality of the host apparatuses 100a to 100c.

Three host apparatuses 100a to 100c are illustrated in FIG. 1, but this is merely exemplary for convenience of description. The number of the host apparatuses is not limited thereto. The structure of the plurality of host apparatuses 100a to 100c will be explained later in more detail with reference to FIG. 2.

The shared server 200 is connected to the plurality of host apparatuses 100a to 100c via the network 300, receives information regarding favorite image reading apparatuses to be shared from the plurality of host apparatuses 100a to 100c, and stores the received information. If the plurality of host apparatuses 100a to 100c requests the information regarding the favorites, the shared server 200 may provide information regarding the favorite image reading apparatuses of each of the pre-stored host apparatuses 100a to 100c to the host apparatus which has requested the information.

If the information regarding the favorite image reading apparatuses to be shared is uploaded to the shared server 200, and the plurality of host apparatuses 100a to 100c desire to download the information from a single host apparatus 100 concurrently, the load occurring on the host apparatus 100 may be resolved.

Figure 2:
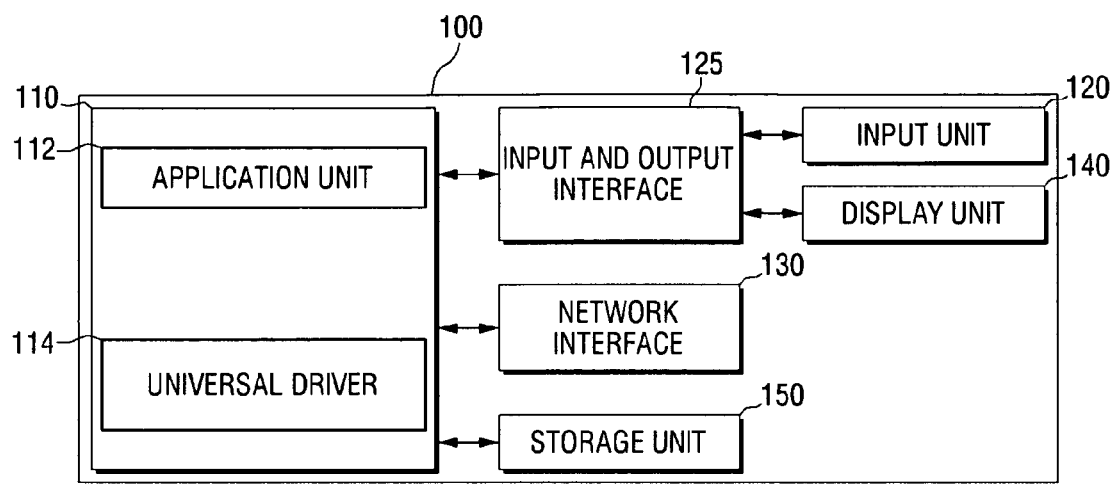
FIG. 2 is a block diagram of a host apparatus according to an exemplary embodiment.

FIG. 2 is a block diagram of a host apparatus according to an exemplary embodiment.

Referring to FIG. 2, a host apparatus 100 according to an exemplary embodiment includes a main controller 110, an input unit 120, an input and output interface 125, a network interface 130, a display unit 140, and a storage unit 150. The main controller 110 includes an application unit 112 and a universal driver 114 for image reading apparatuses. The structure of the host apparatus 100 is the same as those of the plurality of host apparatuses 100a to 100c shown in FIG. 1.

The application unit 112 may be an application program to execute the universal driver 114. If a user selects the universal driver 114 through a menu provided by the application unit 112, the universal driver 114 may be executed. The application unit 112 may be an image editor program, or a scanner program provided by an operating system (OS).

The universal driver 114 may be a driver program which is capable of controlling the plurality of image reading apparatuses 10a and 10b. Herein, the image reading apparatuses 10a and 10b may be a scanner having only a scanning function or a multifunction peripheral (MFP) having the scanning function, and at least one of a printing function, a facsimile data transmission/reception function, and a copying function, for example.

The universal driver 114 searches for the image reading apparatuses 10a and 10b connected to the host apparatus 100 to control the plurality of image reading apparatuses 10a and 10b. In this situation, the plurality of image reading apparatuses 10a and 10b may be connected to the host apparatus 100 over a local connection, such as a universal serial bus (USB) or over the network 300, which may be wired or wireless. That is, the universal driver 114 may search for all of the image reading apparatuses connected to the host apparatus 100, irrespective of the connection type.

Generally, if the universal driver 114 is executed, the image reading apparatuses are searched. However, if information regarding the image reading apparatuses which have been searched previously is stored, the information may be used without re-searching for image reading apparatuses.

The universal driver 114 searches for image reading apparatuses, registers at least one of the searched image reading apparatuses to a list of favorites, and selects at least one from the list to share. To do so, the universal driver 114 provides a user interface (UI) so that a user may select an image reading apparatus to be registered to a list of favorites and selects favorites to be shared. Herein, the list may include a shared part and an obtained part. The shared part may be a list of favorites which will be described later, and the obtained part may be a list of favorites obtained from an external source.

The universal driver 114 may select at least one favorite image reading apparatus to be shared from the list of the shared part.

A user may select whether or not to activate a sharing function and an obtaining function from outside using a UI provided by the universal driver 114. If the public sharing function is activated, the universal driver 114 controls the network interface 130 to transmit information regarding favorite image reading apparatuses to be shared to another host apparatus connected via the network 300. On the other hand, if the obtaining function is activated, the universal driver 114 controls the network interface 130 to receive information regarding favorite image reading apparatuses to be shared from another host apparatus of which a public sharing function is activated, among the host apparatuses connected over the network 300. By doing so, the host apparatus 100 obtains information regarding the favorite image reading apparatuses to be shared from another host apparatus, and provides the other host apparatus with information regarding the favorite image reading apparatus(es) of the host apparatus 100. That is, the plurality of host apparatuses 100a to 100c may share information regarding the favorite image reading apparatuses to be shared.

The universal driver 114 registers an image reading apparatus which a user usually uses as a default apparatus, and creates a group of favorites for other image reading apparatuses according to a predetermined standard when registering at least one image reading apparatus to a list of favorites, so that the universal driver 114 may register at least one image reading apparatus for each group.

The universal driver 114 displays a list of image reading apparatuses, a list of favorite image reading apparatuses, and a list of information acquired from an external source, which are searched through the UI, and receives a user's selection signal from each list. The UI provided by the universal driver 114 will be described later in more detail with reference to FIGS. 3 to 5C.

The input unit 120 receives a selection signal (or a request signal) from an input device of the host apparatus 100, such as a keyboard and a mouse, for example. In this exemplary embodiment, the selection signal input through the input unit 120 may be a signal to select one of the lists displayed on the UI provided by the universal driver 114.

The input and output interface 125 may cause the input unit 120 and the display unit 140 to interface with the main controller 110.

The network interface 130 supports an interface between the host apparatus 100 and the network 300. The host apparatus 100 transmits and receives information to and from other host apparatuses connected to the network 300 through the network interface 130.

The network interface 130 may transmit information regarding favorite image reading apparatuses to be shared to other host apparatuses and receive information regarding favorite image reading apparatuses to be shared from other host apparatuses under the control of the universal driver 114. Specifically, the network interface 130 searches for at least one of the other host apparatuses in order to share the list of favorites, and if the host apparatus is connected to the searched host apparatus, the network interface 130 may transmit or receive the list of favorite image reading apparatuses according to the request of either the host apparatus or the searched host apparatus.

The network interface 130 may update the list of favorite image reading apparatuses at the host apparatus or the searched host apparatus according to the transmitted or received list of favorites.

The display unit 140 may display various information that the host apparatus 100 provides to a user. In this exemplary embodiment, the display unit 140 may display a UI provided by the universal driver 114.

The storage unit 150 may store various information required to operate the host apparatus 100. In this exemplary embodiment, the storage unit 150 may store a list of favorite image reading apparatuses registered by the universal driver 114.

A system of sharing favorites according to another exemplary embodiment includes at least one host apparatus, at least one image reading apparatus, and a shared server.

The at least one image reading apparatus is connected to the at least one host apparatus via a network.

If at least one of the image reading apparatuses registered to the list of favorites is set to be shared, the at least one host apparatus may transmit information regarding the favorite image reading apparatuses to be shared to the shared server.

The shared server receives and stores the transmitted information.

If a specific host apparatus requests information regarding the favorite image reading apparatuses to be shared, the shared server may transmit the information to the specific host apparatus.

The host apparatus may update information regarding the favorite image reading apparatuses to be shared based on the transmitted or received information.

The repeated description regarding the operation of the host apparatus will be omitted when the shared system is described.

Figure 3:
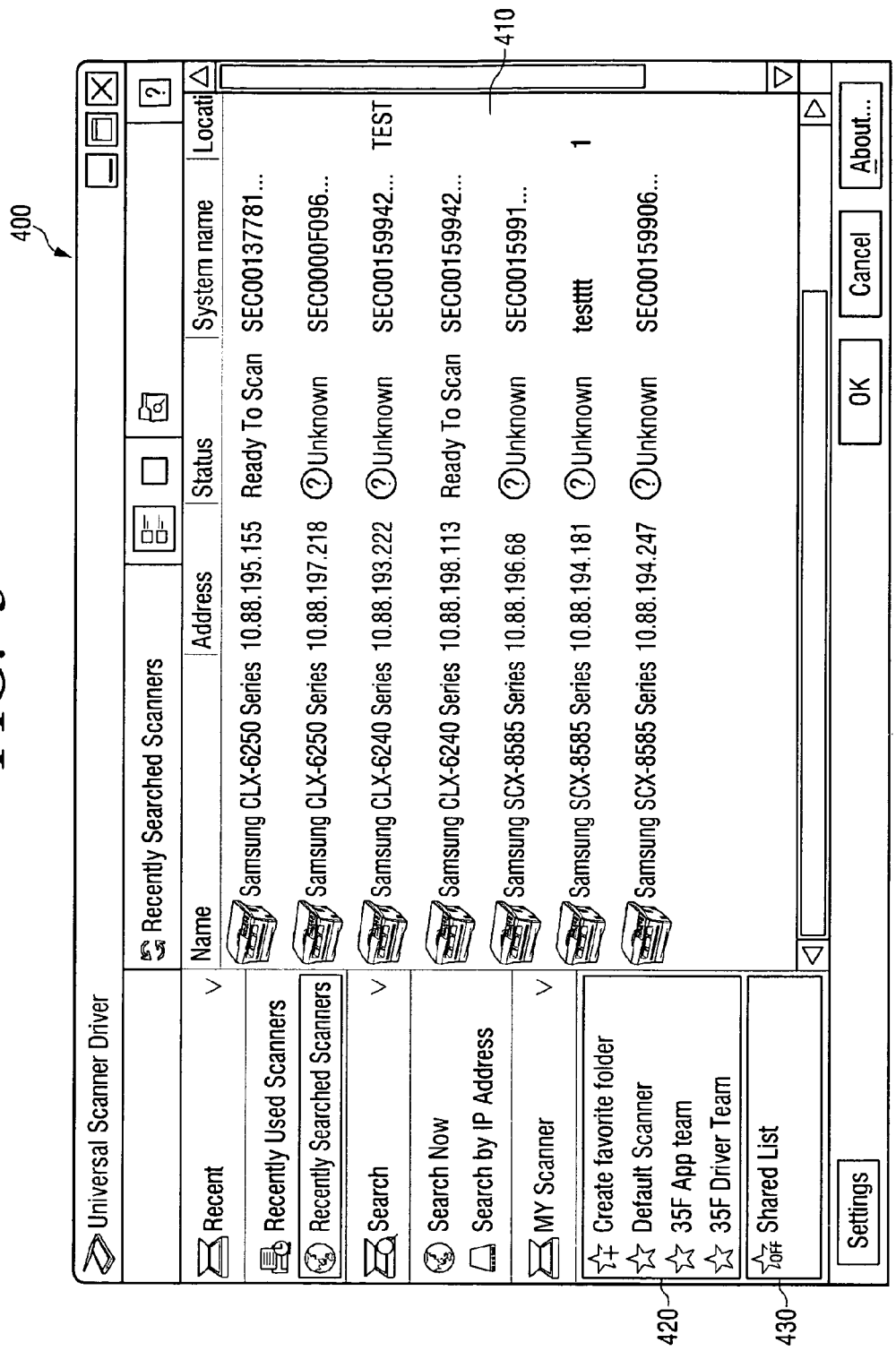
FIG. 3 is a view of a user interface (UI) of a universal driver of an image reading apparatus according to an exemplary embodiment.

FIG. 3 is a view of a user interface (UI) of a universal driver of an image reading apparatus according to an exemplary embodiment.

FIG. 3 exemplifies a general UI 400 provided by the universal driver 114. In FIG. 3, the universal driver 114 is executed and thus a plurality of image reading apparatuses connected to the host apparatus 100 is listed in a first window 410 to display a searched result.

The first window 410 displays the information regarding the searched image reading apparatuses, and the information may be, for example, a name, an address, a status, a system name, and a location, for example. A user may recognize the characteristics of the image reading apparatuses through the displayed information of the image reading apparatuses, and set a desired image reading apparatus to be a default device or add a desired image reading apparatus to the list of favorite image reading apparatuses.

The general UI 400 includes a second window 420 indicating favorites. In this exemplary embodiment, the second window 420 displays a menu "Create favorite folder" to create a group of favorites and a menu "Default Scanner" to register a default device, and further displays menus "35F. App Team" and "35F. Driver Team" which have been previously created.

Another group of favorites may be additionally created using the menu "Create favorite, folder," other than the menus "35F. App Team" and "35F. Driver Team" in the pre-created group. At least one image reading apparatus may be registered to each group of favorites which is created using the menu "Create favorite folder". The image reading apparatus registered to the group of favorites may control an image reading apparatus which is selected by a user using a universal image reading apparatus without an additional operation of searching for an image reading apparatus.

A single image reading apparatus that a user usually uses is registered to the menu "Default Scanner" as a default device. If a user selects the menu "Default Scanner," the universal driver 114 may control the scanning operation of the image reading apparatus which is set to be a default device, without an additional operation of searching for and selecting an image reading apparatus.

At least one of the menus "Default Scanner," "35F. App Team," and "35F. Driver Team" may be set on the second window 420 to be shared. Herein, the menu "Default Scanner" is different from the menus "35F. App Team" and "35F. Driver Team," in that a single image reading apparatus is registered to the menu "Default Scanner," whereas two or more image reading apparatuses may be registered to the menus "35F. App Team" and "35F. Driver Team."

In addition, a third window 430 to display a list of information obtained from an external source is further displayed on the UI 400. In FIG. 3, the menu "Shared List" is displayed on the third window 430 as being set to OFF. This exemplifies that the function of obtaining information to be shared from an external source is inactivated.

Figure 4A:
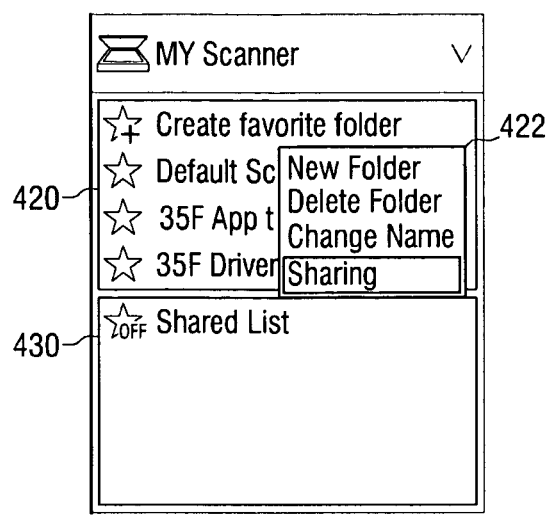
FIGS. 4A and 4B are views of the operation of activating a sharing function on the UI shown in FIG. 3.
Figure 4B:
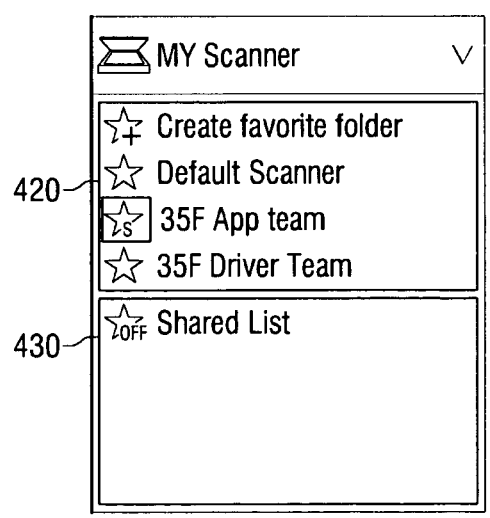

FIGS. 4A and 4B are views of the operation of activating a sharing function on the UI shown in FIG. 3.

FIGS. 4A and 4B illustrate only the second window 420 and the third window 430 from the UI 400 of FIG. 3. The method of activating the sharing function will be explained with reference to FIGS. 4A and 4B.

Referring to FIG. 4A, the menus "Create favorite folder," "Default Scanner," "35F. App Team," and "35F. Driver Team" are displayed on the second window 420. If a user places a cursor on the menu "35F. App Team" using a mouse, and clicks a right button, for example, of the mouse in order to set the menu "35F. App Team" to be shared, a floating menu 422 is displayed. In this situation, if the user selects a menu "Sharing," the menu "35F. App Team" is set to be shared.

As shown in FIGS. 4A and 4B, a menu "New Folder" to create a new group of favorites, a menu "Delete Folder" to delete a pre-created group of favorites, and a menu "Change Name" to change a name of a pre-created group of favorites may be further displayed in the floating menu 422.

Referring to FIG. 4B, an icon "S" may be displayed at a fore portion of the menu "35F. App Team" displayed in the second window 420. This represents that the group of favorite image reading apparatuses corresponding to the menu "35F. App Team" is set to be shared.

Figure 5A:
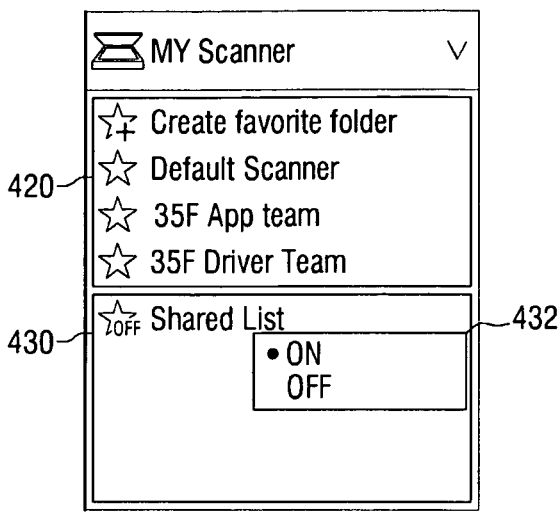
FIGS. 5A to 5C are views of the operation of activating an obtaining function from outside on the UI shown in FIG. 3.
Figure 5B:
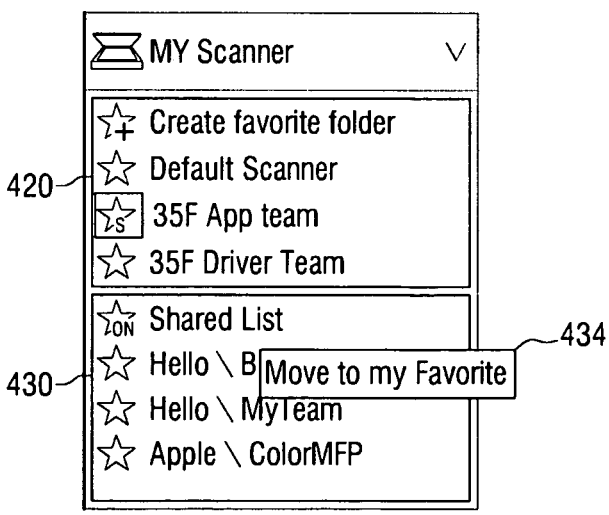
Figure 5C:
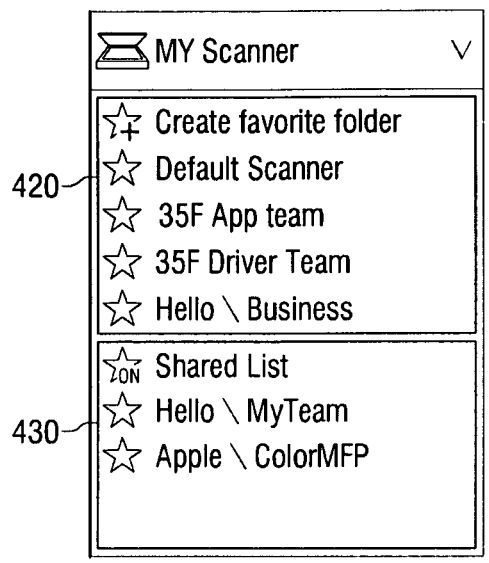

FIGS. 5A to 5C are views of the operation of activating an obtaining function from outside on the UI shown in FIG. 3.

FIGS. 5A to 5C illustrate only the second window 420 and the third window 430 from the UI 400 of FIG. 3. The method of activating the obtaining function will be explained with reference to FIGS. 5A to 5C.

Referring to FIG. 5A, the menus "Create favorite folder," "Default Scanner," "35F. App Team," and "35F. Driver Team" are displayed on the second window 420.

A user places a cursor on the third window 430 and clicks a right button, for example, of the mouse in order to activate the obtaining function. By doing so, a floating menu 432 having ON and OFF messages is displayed. If a user selects "ON," the obtaining function may be activated.

If the obtaining function is activated by the user's selection, the universal driver 114 generates a signal which requests other host apparatuses connected to the host apparatus 100 via the network 300 to transmit information regarding favorite image reading apparatuses to be shared. The signal may be transmitted to the other host apparatuses through the network interface 130, and the host apparatus 100 of which the sharing function is activated may provide information regarding favorites to be shared of their own.

If the information regarding favorites to be shared is received from the other host apparatuses by the above operations, the received information is displayed on the third window 430. This is illustrated in FIG. 5B.

If a user selects one of shared information of the other host apparatuses displayed on the third window 430, a user may control the scanning operation of the selected image reading apparatus using the universal driver 114 in the same manner as the image reading apparatus registered to a list of favorites.

However, if another host apparatus which transmits information regarding favorites to be shared inactivates the sharing function, a user may not control the shared image reading apparatus displayed on the third window 430 anymore. For this reason, if a user desires to use the shared information received from the other host apparatus, the user may move the shared information to the list of favorites.

In FIG. 5B, if a user desires to move the group "Hello/MyTeam" among the shared information of the other host apparatuses displayed on the third window 430 to the group of favorites of the host apparatus, the user may move a cursor on the group "Hello/MyTeam" and click a right button of a mouse, for example. Accordingly, a floating menu 434 "Move to my Favorite" is displayed, and if the user selects the floating menu 434, the group "Hello/MyTeam" is moved to the second window 420.

The case that the group "Hello/MyTeam" is moved to the second window 420 is illustrated in FIG. 5C. As the group "Hello/MyTeam" is moved to the second window 420, the image reading apparatuses registered to the group "Hello/MyTeam" may control the scanning operation using the universal driver 114, irrespective of activating the sharing function of the other host apparatuses.

Figure 6A:
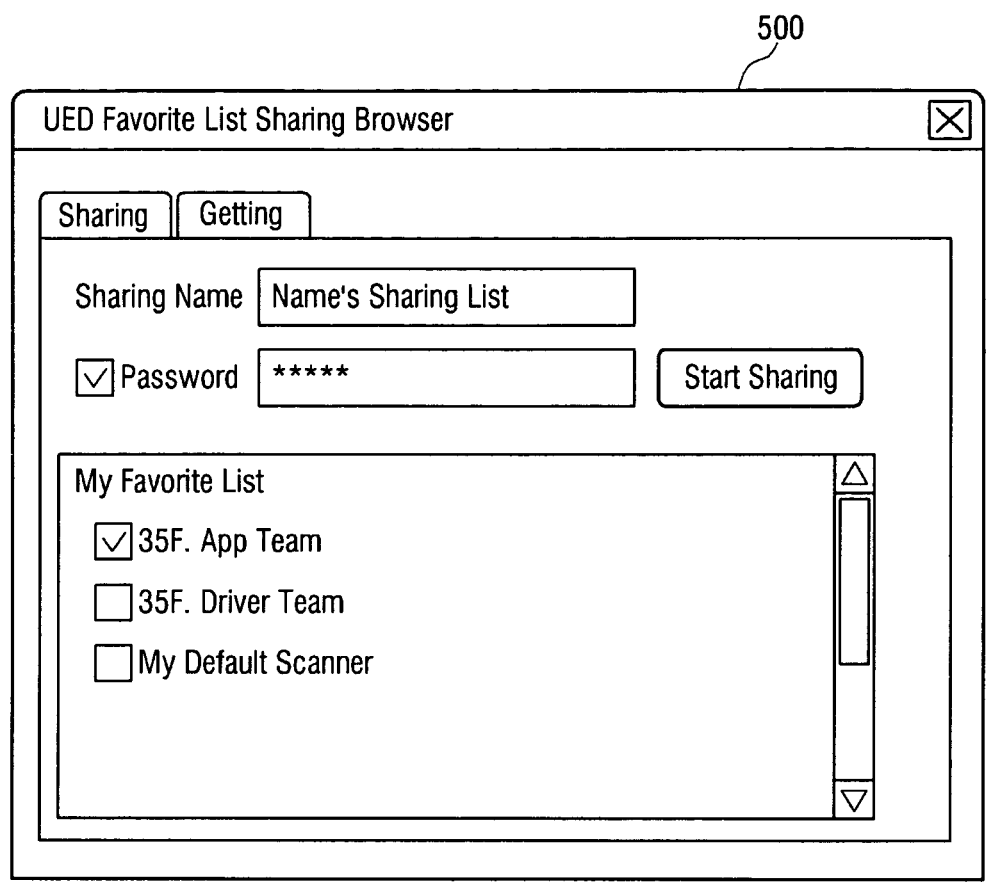
FIGS. 6A and 6B are views of a UI to set a password for authorization of favorites to be shared.
Figure 6B:
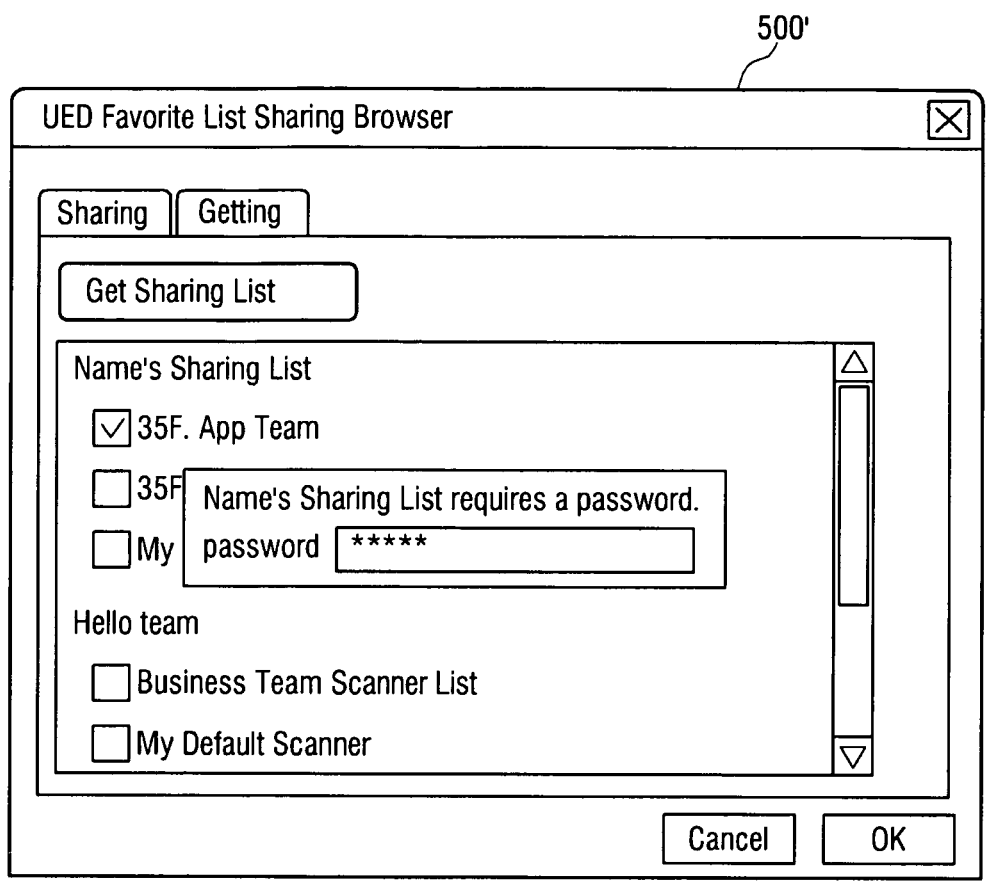

FIGS. 6A and 6B are views of a UI to set a password for authorization of favorites to be shared.

FIG. 6A exemplifies a UI 500 to set a password when the universal driver 114 creates a group of favorites in order to assign authorization for the group of favorites. In this situation, the name and the password of the group of favorites may be set.

FIG. 6B exemplifies a UI 500' to input a preset password when information of favorites to be shared is received from the other host apparatuses and the password is set to the shared information.

FIG. 7 is a flowchart of the process of sharing favorites of a host apparatus according to an exemplary embodiment.

A method to share favorites of a host apparatus will be explained with reference to FIG. 7. The universal driver 114 of the host apparatus 100 searches for image reading apparatuses and registers at least one of the searched image reading apparatuses to a list of favorites in operation 710.

At least one of the image reading apparatuses registered to the list of favorites is selected to be shared in operation 720, and a sharing function to share the list of favorite image reading apparatuses of the selected apparatus is activated in operation 730.

The network interface 130 searches for at least one of other host apparatuses to share the favorite image reading apparatuses in operation 740, and if the host apparatus 100 is connected to the other searched host apparatus, the list of favorites is transmitted or received according to the request of the host apparatuses in operation 750.

According to the method to share a list of favorites of a host apparatus, the host apparatus or the other host apparatuses may update a list of favorites according to the result of transmitting or receiving a list of favorites.

FIG. 8 is a flowchart of the process of sharing favorites of a host apparatus according to another exemplary embodiment.

A user selects the universal driver 114 through the application unit 112, and executes the universal driver 114 in operation 800. The universal driver 114 searches for all of the image reading apparatuses connected to the host apparatus 100 in operation 810.

The universal driver 114 provides the general UI 400 having the same format as that of FIG. 3, and a user registers at least one image reading apparatus to a list of favorites at the second window 420 in operation 820.

After the at least one image reading apparatus is registered to the list of favorites at the second window 420, a user sets the favorites to be shared with the other host apparatuses in operation 830.

If the sharing function is activated in operation 840-Y, the universal driver 114 controls the network interface 130 to transmit the information regarding the favorite image reading apparatuses to be shared to the other host apparatuses in operation 850.

If an obtaining function is activated in operation 860-Y, the universal driver 114 may receive the information regarding the favorite image reading apparatuses to be shared from the other host apparatuses through the network interface 130 in operation S870.

The host apparatus 100 may share the list of favorites with the other host apparatuses through the above operations, and use the lists of favorites of the other host apparatuses. That is, according to the method to share favorites, the plurality of host apparatuses 100a to 100c share their lists of favorites with each other, and thus the operation of searching and selecting image reading apparatuses by the universal driver 114 may be omitted.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. A method to share favorite image reading apparatuses of a first host apparatus, which is connected to at least an other host apparatus over a network, and to which at least one universal driver capable of controlling a plurality of image reading apparatuses is installed in at least the first host apparatus and the other host apparatus, the method comprising:

searching, controlled by the at least one universal driver, for image reading apparatuses and registering at least one of the searched image reading apparatuses to a list of favorite image reading apparatuses at the first host apparatus;

selecting at least one of the registered favorite image reading apparatuses to be shared, based at least in part upon a user selection;

activating a sharing function to share the selected at least one of the registered favorite image reading apparatuses, by the at least one universal driver;

searching for the other host apparatus where the sharing function is activated to share the selected at least one of the registered favorite image reading apparatuses, controlled by the at least one universal driver;

receiving a second list of favorite image reading apparatuses to be shared from the other host apparatus according to a request of the first host apparatus when the first host apparatus is connected to the searched other host apparatus, by the at least one universal driver; and registering information regarding the second list of favorite image reading apparatuses to be shared, which is received from the other host apparatus, to the list of favorite image reading apparatuses at the first host apparatus, according to a second user selection so that the first host apparatus uses the information regarding the second list of favorite image reading apparatuses to be shared, which is received from the other host apparatus, irrespective of activating the sharing function of the other host apparatuses.

2. The method according to claim 1, further comprising updating the list of favorite image reading apparatuses at the first host apparatus or the searched other host apparatus according to the result of transmitting or receiving the list of favorite reading apparatuses.

3. The method according to claim 1, further comprising:

activating an obtaining function; and receiving information regarding the second list of favorite image reading apparatuses, which is set at the other host apparatus, from the other host apparatus.

4. The method according to claim 1, wherein the registering includes registering one of the searched image reading apparatuses, and the selecting includes selecting the image reading apparatus to be shared.

5. The method according to claim 1, wherein the registering further comprises:
creating at least one group of favorite image reading apparatuses; and
registering at least one of the searched image reading apparatuses to the created group of favorite image reading apparatuses,
wherein the selecting includes selecting at least one group of favorite image reading apparatuses to which the at least one image reading apparatus is registered to be shared.

6. The method according to claim 1, further comprising:
displaying information regarding the second list of favorite image reading apparatuses to be shared, which is received from the other host apparatus, on a list of favorite image reading apparatuses obtained from an external source; and
moving, by selecting with a cursor, at least one of the shared information displayed on the list of favorite image reading apparatuses obtained from an external source to the list of favorite image reading apparatuses at the first host apparatus.

7. The method according to claim 1, further comprising setting a password to assert authorization for the selected at least one favorite image reading apparatus to be shared.

8. The method according to claim 1, further comprising:
uploading information regarding the selected at least one of the registered favorite image reading apparatuses to be shared to a shared server;
uploading information regarding at least one of the second list of favorite image reading apparatus to be shared from the other host apparatus to the shared server; and
downloading, to the first host apparatus, the information regarding the at least one of the second list of favorite image reading apparatus to be shared of the other host apparatus, from the shared server.

9. The method according to claim 1, wherein the list of favorite image reading apparatuses of the first host apparatus or the second list of favorite image reading apparatuses of the other host apparatus comprises a shared part and an obtained part, wherein the selecting including selecting at least one of the lists in the shared part, by a user.

10. The method according to claim 1,
wherein the registering information regarding the second list of favorite image reading apparatuses to be shared is registered to the list of favorite image reading apparatuses at the first host apparatus, irrespective of inactivating sharing function of the other host apparatus that occurs after registering information regarding the second list of favorite image reading apparatuses to be shared to the list of favorite image reading apparatuses at the first host apparatus.

11. A host apparatus connected to at least one other host apparatus over a network, the host apparatus comprising:
a universal driver capable of controlling at least one image reading apparatus, the universal driver to control searching for image reading apparatuses, to register at least one of the searched image reading apparatuses to a list of favorite image reading apparatuses, and to select at least one of the registered favorite image reading apparatuses to be shared;
an input unit to receive a request signal to activate a sharing function to share the selected at least one favorite image reading apparatus; and
a network interface to search for at least one other host apparatus where a sharing function is activated, by the at least one universal driver, to share the selected at least one of the registered favorite image reading apparatuses, and to receive a second list of favorite image reading apparatuses of the other host apparatus according to a request of the host apparatus when the host apparatus is connected to the searched other host apparatus,
wherein the universal driver controls to register information regarding the second list of favorite image reading apparatuses to be shared, which is received from the other host apparatus, to the list of favorite image reading apparatuses at the host apparatus, according to user selection so that the first host apparatus uses the information regarding the second list of favorite image reading apparatuses to be shared, which is received from the other host apparatus, irrespective of activating the sharing function of the other host apparatuses.

12. The host apparatus according to claim 11, wherein the network interface updates the list of favorite image reading apparatuses on the host apparatus or the second list of favorite image reading apparatuses on the other host apparatus according to a result of transmitting the list of favorite image reading apparatuses of the host apparatus and receiving the list of favorite image reading apparatuses of the other host apparatus.

13. The host apparatus according to claim 11, wherein the input unit receives a request signal to activate an obtaining function, and the network interface receives information regarding the second list of favorite image reading apparatuses to be shared, which is set at the other host apparatus, from the other host apparatus.

14. The host apparatus according to claim 11, wherein the universal driver registers one of the searched image reading apparatuses, and sets the image reading apparatus to be shared.

15. The host apparatus according to claim 11, wherein the universal driver creates at least one group of favorite image reading apparatuses on the list of favorite image reading apparatuses, registers at least one of the searched image reading apparatuses to the created group of favorite image reading apparatuses, and sets at least one of the groups of favorite image reading apparatuses to which the at least one image reading apparatus is registered to be shared.

16. The host apparatus according to claim 11, further comprising: a display to display the list of favorite image reading apparatuses and the list of obtained favorite image reading apparatuses,
wherein the universal driver controls the display to display information regarding the second list of favorite image reading apparatuses to be shared, which is received from the other host apparatus, on the list of obtained favorite image reading apparatuses, and moves, via selection with a cursor, at least one of the shared information displayed on the list of obtained favorite image reading apparatuses to the list of favorite image reading apparatuses at the host computer.

17. The host apparatus according to claim 11, wherein the universal driver receives a password corresponding to the selected at least one favorite image reading apparatus to be shared through the input unit, and sets the password to the selected at least one favorite image reading apparatus to be shared.

18. The host apparatus according to claim 11, wherein the network interface uploads information regarding the selected at least one favorite image reading apparatus to be shared to a shared server, and downloads the information regarding the second list of favorite image reading apparatus to be shared of the other host apparatus from the shared server.

19. The host apparatus according to claim 11, wherein the universal driver controls to register information regarding the second list of favorite image reading apparatuses to be shared is registered to the list of favorite image reading apparatuses at the host apparatus, irrespective of inactivating sharing function of the other host apparatus that occurs after registering information regarding the second list of favorite image reading apparatuses to be shared to the list of favorite image reading apparatuses at the host apparatus.

20. A shared system for sharing favorite image reading apparatuses, the shared system comprising:
    at least one image reading apparatus;
    at least one host apparatus, including at least one universal driver, connected to the at least one image reading apparatus over a network, the at least one host apparatus to transmit information regarding at least one favorite image reading apparatus to be shared with an other host apparatus when at least one of the image reading apparatuses registered to a list of favorite image reading apparatuses is set to be shared and a sharing function to share the favorite at least one image reading apparatus to be shared is activated;
    the at least one universal driver capable of controlling the at least one image reading apparatus, the at least one universal driver to control searching for image reading apparatuses, to register at least one of the searched image reading apparatuses to the list of favorite image reading apparatuses, to select at least one of the registered favorite image reading apparatuses to be shared, and to control activation of a sharing function to share the selected at least one of the registered favorite image reading apparatuses; and
    a shared server to receive and store the transmitted information from the at least one host apparatus,
    wherein a first host apparatus of the at least one host apparatus requests information regarding favorite image reading apparatuses to be shared, which is received from the at least one host apparatus to the shared server, and when information regarding a second list of favorite image reading apparatuses to be shared is transmitted from the shared server, registers information regarding the second list of favorite image reading apparatuses to be shared, which is received from the shared server to the list of favorite image reading apparatuses at the first host apparatus according to user selection so that the first host apparatus uses the information regarding the second list of favorite image reading apparatuses to be shared, which is received from the other host apparatus, irrespective of activating the sharing function of the other host apparatuses.

21. The shared system according to claim 20, wherein the shared server transmits the stored information regarding at least one favorite image reading apparatus to be shared to a specific host apparatus according to a request of the specific host apparatus among the at least one host apparatus.

22. The shared system according to claim 21, wherein the at least one host apparatus updates information regarding the at least one favorite image reading apparatus to be shared based on a result of transmitting information regarding the at least one favorite image reading apparatus to be shared or receiving information regarding at least one favorite image reading apparatus to be shared.

23. The shared system according to claim 20,
    wherein the first host apparatus registers information regarding the second list of favorite image reading apparatuses to be shared is registered to the list of favorite image reading apparatuses at the first host apparatus, irrespective of inactivating sharing function of the other host apparatus that occurs after registering information regarding the second list of favorite image reading apparatuses to be shared to the list of favorite image reading apparatuses at the first host apparatus.

* * * * *

UNITED STATES PATENT AND TRADEMARK OFFICE
CERTIFICATE OF CORRECTION

| | | |
|---|---|---|
| PATENT NO. | : 8,755,057 B2 | Page 1 of 1 |
| APPLICATION NO. | : 12/801338 | |
| DATED | : June 17, 2014 | |
| INVENTOR(S) | : Park et al. | |

It is certified that error appears in the above-identified patent and that said Letters Patent is hereby corrected as shown below:

On the Title Page, insert
    Item -- [30] (Foreign Application Priority Data), Korean Patent Application No. 2009-0077513, filed
    August 21, 2009 --

Signed and Sealed this
Ninth Day of September, 2014

Michelle K. Lee
*Deputy Director of the United States Patent and Trademark Office*